(12) United States Patent
Farrington et al.

(10) Patent No.: US 8,173,319 B2
(45) Date of Patent: May 8, 2012

(54) FUEL CELL WATER MANAGEMENT SYSTEM AND METHOD

(75) Inventors: Simon Farrington, Vancouver (CA); Cara N Startek, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 1302 days.

(21) Appl. No.: 11/318,064

(22) Filed: Dec. 23, 2005

(65) Prior Publication Data

US 2007/0148526 A1    Jun. 28, 2007

(51) Int. Cl.
*H01M 8/02*    (2006.01)
(52) U.S. Cl. .................................. 429/457; 429/456
(58) Field of Classification Search .............. 429/34, 429/457, 456
See application file for complete search history.

(56) References Cited

U.S. PATENT DOCUMENTS

| | | | |
|---|---|---|---|
| 5,366,818 A | 11/1994 | Wilkinson et al. | 429/13 |
| 5,728,446 A | 3/1998 | Johnston et al. | 428/167 |
| 5,742,955 A | 4/1998 | Parkay et al. | 4/583 |
| 6,329,094 B1 | 12/2001 | Yasuo et al. | 429/34 |
| 6,475,655 B1 | 11/2002 | Nakanishi et al. | 429/19 |
| 6,555,261 B1 | 4/2003 | Lewinski et al. | 429/34 |
| 6,663,997 B2 | 12/2003 | Dong et al. | 429/39 |
| 6,875,530 B2 | 4/2005 | Kanai | 429/13 |
| 2002/0119360 A1 | 8/2002 | Dong et al. | 429/34 |
| 2004/0237778 A1 | 12/2004 | Charlat | 95/45 |

FOREIGN PATENT DOCUMENTS

| | | |
|---|---|---|
| EP | 1 575 107 A2 | 9/2005 |
| GB | 2 387 476 A | 10/2003 |
| JP | 9-55215 | 2/1997 |
| JP | 2001-185173 A | 7/2001 |
| JP | 2005-093244 A | 4/2005 |
| WO | 91/05922 A1 | 5/1991 |
| WO | WO 98/52242 | 11/1998 |
| WO | WO 00/26981 | 5/2000 |
| WO | 2004/114446 A1 | 12/2004 |

OTHER PUBLICATIONS

International Preliminary Report on Patentablilty (Ten (10) pages).

*Primary Examiner* — Jane Rhee
(74) *Attorney, Agent, or Firm* — Patent Central LLC; Stephan A. Pendorf (57) ABSTRACT

Systems and methods for transporting accumulated water in a fuel cell system are disclosed. Briefly described, in one aspect, a system comprises a fuel cell flow field plate with at least one channel disposed on a surface of the fuel cell flow field plate, and at least one water management fin residing on a wall of the channel such that when the accumulated water is transported along the channel the water management fin guides the accumulated water.

30 Claims, 10 Drawing Sheets

FUEL CELL WATER MANAGEMENT SYSTEM AND METHOD

BACKGROUND OF THE INVENTION

1. Field of the Invention

The present invention relates generally to fuel cell systems, and, more particularly, to water management in a fuel cell system.

2. Description of the Related Art

Electrochemical fuel cells convert reactants, namely fuel and oxidant fluid streams, to generate electric power and reaction products. Electrochemical fuel cells generally employ an electrolyte disposed between two electrodes, namely a cathode and an anode. An electrocatalyst, disposed at the interfaces between the electrolyte and the electrodes, typically induces the desired electrochemical reactions at the electrodes. The location of the electrocatalyst generally defines the electrochemically active area.

One type of electrochemical fuel cell is the proton exchange membrane (PEM) fuel cell. PEM fuel cells generally employ a membrane electrode assembly (MEA) comprising a solid polymer electrolyte or ion-exchange membrane disposed between two electrodes. Each electrode typically comprises a porous, electrically conductive substrate, such as carbon fiber paper or carbon cloth, which provides structural support to the membrane and serves as a fluid diffusion layer. The membrane is ion conductive, typically proton conductive, and acts both as a barrier for isolating the reactant streams from each other and as an electrical insulator between the two electrodes. A typical commercial PEM is a sulfonated perfluorocarbon membrane sold by E.I. Du Pont de Nemours and Company under the trade designation NAFION®. The electrocatalyst is typically a precious metal composition (e.g., platinum metal black or an alloy thereof) and may be provided on a suitable support (e.g., fine platinum particles supported on a carbon black support).

In a fuel cell, an MEA is typically interposed between two separator plates that are substantially impermeable to the reactant fluid streams. Such plates are referred to hereinafter as flow field plates. The flow field plates provide support for the MEA. In addition, the flow field plates have channels, trenches or the like formed therein which serve as paths to provide access for the reactant and the oxidant fluid streams to the respective porous electrodes. Also, the fluid paths provide for the removal of reaction byproducts and depleted gases formed during operation of the fuel cell.

In a fuel cell stack, a plurality of fuel cells are connected together, typically in series, to increase the overall output power of the fuel cell system. In such an arrangement, one side of a given separator flow field plate may be referred to as an anode flow field plate for one cell and the other side of the plate may be referred to as the cathode flow field plate for the adjacent cell.

A plurality of inlet ports, supply manifolds, exhaust manifolds and outlet ports are utilized to direct the reactant fluid to the reactant channels in the flow field plates. The supply and exhaust manifolds may be internal manifolds, which extend through aligned openings formed in the flow field plates and MEAs, or may comprise external or edge manifolds, attached to the edges of the flow field plates. A variety of configurations are possible.

A broad range of reactants can be used in PEM fuel cells. For example, the fuel stream may be substantially pure hydrogen gas, a gaseous hydrogen-containing reformate stream, or methanol in a direct methanol fuel cell. The oxidant may be, for example, substantially pure oxygen or a dilute oxygen stream such as air.

During normal operation of a PEM fuel cell, fuel is electrochemically oxidized on the anode side, typically resulting in the generation of protons, electrons, and possibly other species depending on the fuel employed. The protons are conducted from the reaction sites at which they are generated, through the membrane, to electrochemically react with the oxidant on the cathode side. The electrons travel through an external circuit providing useable power and then react with the protons and oxidant on the cathode side to generate water reaction product.

As noted above, the channels of the flow field plate serve two functions: to deliver reactants/oxidants to the active region of the membrane, and to remove byproducts and depleted gasses resulting from the electrochemical generation process. When hydrogen is used as the reactant and oxygen is used as the oxidant, one of the byproducts of the electrochemical generation process is water. Although some amount of water in the active region of the membrane is desirable, the accumulation of water can result in undesirable amounts of water in some regions of the fuel cell.

Water may accumulate in the flow field channels. As gas is injected into the flow field plate channels (reactants and/or oxidants), gas pressure and movement may "flush" the accumulated water through the above-described outlets.

If a relatively large amount of water collects in a localized region of a flow field plate channel, however, the channel may become blocked by the water. If the channel becomes blocked by accumulated water, gas flow stops. Consequently, as the reactants and/or oxidants in the gas residing in the blocked channel are depleted, electrical output of the fuel cell decreases. Maintaining fuel cell efficiency is very desirable.

In some fuel cell systems, other problems may arise from the accumulation of water in and around the membrane. Droplets of water may divert gas flow into less-than-optimal patterns over the membrane. Water droplets reduce the hydraulic diameter of the flow field plate channel, thereby increasing gas flow resistance in the region around the water droplet. Furthermore, because the gas must diffuse around a water droplet, gas diffusion distance is increased. Because gas (reactants and/or oxidants) cannot reach the membrane where the water droplet has formed, that area of the membrane will become inactive and result in distortions of the current density distribution in the fuel cell membrane, thereby reducing fuel cell efficiency. Furthermore, if left standing in a region of the membrane, flow field plate channel and/or other location of the fuel cell, the accumulated water may result in corrosion or deformation to the membrane or other parts of the fuel cell system.

BRIEF SUMMARY OF THE INVENTION

The present invention is directed to systems and methods for transporting accumulated water in a fuel cell system. In one aspect, a system comprises a fuel cell flow field plate with at least one channel disposed on a surface thereof, and at least one water management fin residing on a wall of the channel such that when accumulated water is transported along the channel the water management fin guides the accumulated water.

In another aspect, a method comprises guiding accumulated water from a top portion of a water management fin to a bottom portion of the water management fin, the water management fin residing in a channel of a fuel cell flow field plate;

and guiding the accumulated water from the bottom portion of the water management fin to a channel root.

These and other aspects of the invention will be evident upon reference to the following detailed description and attached drawings.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIGS. 6-10B illustrate several alternate embodiments of water management fin and channel root configurations according to the present invention.

DETAILED DESCRIPTION OF THE INVENTION

In the following description and enclosed drawings, certain specific details are set forth in order to provide a thorough understanding of various embodiments of the invention. One skilled in the art will understand, however, that the invention may be practiced without all of these details. In other instances, well-known structures associated with fuel cell systems have not been shown or described in detail to avoid unnecessarily obscuring descriptions of the embodiments of the invention.

Figure 1:
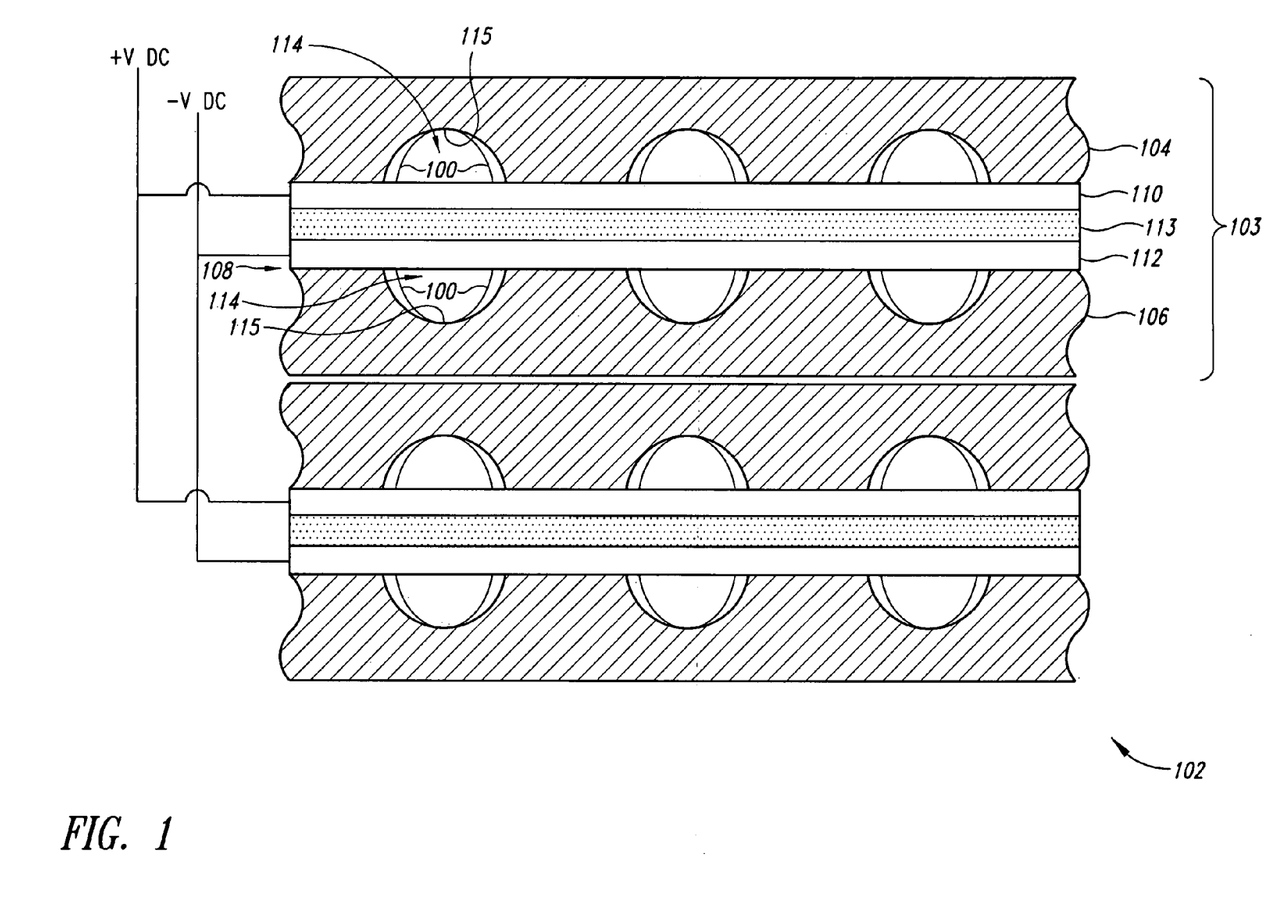
FIG. 1 is an exploded cross-sectional view of a portion of a fuel cell stack according to one embodiment of the present invention.
Figure 2:
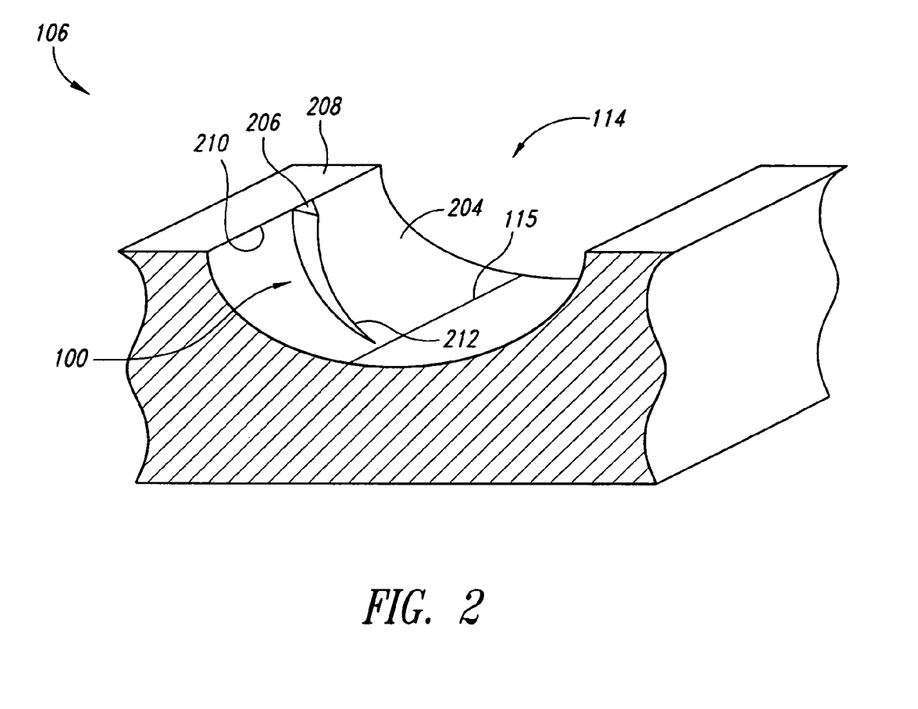
FIG. 2 is a cross-sectional perspective view of a portion of a flow field plate from the fuel cell stack of FIG. 1.
Figure 3:
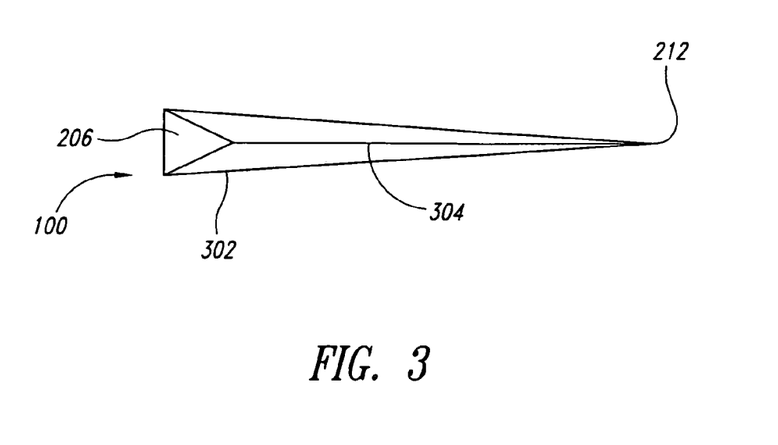
FIG. 3 is a plan view of a water management fin from the flow field plate of FIG. 2.

FIGS. 1-3 illustrate a fuel cell stack 102 having two fuel cells 103, anode and cathode fuel cell flow field plates 104 and 106, respectively, and a pair of membrane electrode assemblies (MEAs) 108. Each MEA 108 includes an anode gas diffusion electrode (GDE) 110, a cathode gas diffusion electrode (GDE) 112 and a membrane 113 therebetween. A plurality of channels 114 in the upper flow field plates 104 provide for the flow of reactant gasses into the anode GDE 110. Similarly, channels in the lower flow field plates 106 provide for the flow of oxidant gasses into the cathode GDE 112. In some types of fuel cell systems, adjacent flow field plates may be made from a single piece of material, with the channels 114 being formed on opposing sides thereof.

During operation, water droplets (not shown) form in the membrane 113 and in the anode and cathode GDEs 110 and 112. As a water droplet is wicked out to a surface of the anode GDE 110 or the cathode GDE 112, further capillary action draws the water droplet into the flow field plate channel 114. When the water is drawn into the channel 114, at least one water management fin 100 protruding from a wall of the channel 114 guides the water to a channel root 115 at a base of the channel. Water entering the channel root 115 joins other accumulated water, and gas movement through the channels 114, and/or gas pressure in the channels, causes the accumulated water on the channel root to form a rivulet along which the accumulated water exits the fuel cell stack 102.

FIG. 2 better illustrates one of the flow field plates 106 and one of the water management fins 100 extending outward from a wall 204 of the flow field channel 114. For clarity, only one water management fin 100 is illustrated in FIG. 2. A top portion 206 of the water management fin 100 (as oriented in FIG. 2) is aligned approximately with a top surface 208 of the flow field plate 106. For example, in one embodiment, the top portion 206 is flush with the surface 208; however, it is appreciated that the top portion 206 may be above or below the surface 208.

The water management fins 100 may be employed in channels 114 of the anode flow field plate 104, the cathode flow field plate 106, or both flow field plates 104, 106. Furthermore, the water management fins 100 may be used in all of the channels 114, selected ones of the channels 114, and/or in selected portions of some or all of the channels 114.

Gas movement and/or pressure transports accumulated water over an edge 210 and into the channel 114. The water enters the flow channel 114, and the water management fin 100 guides at least some of the water from the top portion 206 to an opposing bottom portion 212 and onto the channel root 115 where the water forms a rivulet exiting the fuel cell stack 102.

The channel root 115 is denoted in FIG. 2 as a line extending down the central portion of the channel 114. The channel root 115 may be merely a low point in the channel 114. In some embodiments, however, the channel root 115 may have a structure or features or may otherwise be formed to facilitate water flow.

FIG. 3 is a plan view of the water management fin 100 of this particular embodiment. The shape of an inside edge 302 of the water management fin 100 corresponds to the shape of the wall 204 (FIG. 2). Because the channel 114 illustrated in FIGS. 1 and 2 is elliptical in cross-section, the general shape of the illustrated water management fin 100 is elliptical to conform to the shape of the channel. Along its length, the illustrated water management fin 100 is tapered from its widest at the top portion 206 to its narrowest at the bottom portion 212. An outside edge 304 joins with, or may be approximately aligned with, the inside edge 302 at the bottom portion 212. The illustrated water management fin 100 has a triangular cross-section.

Figure 4:
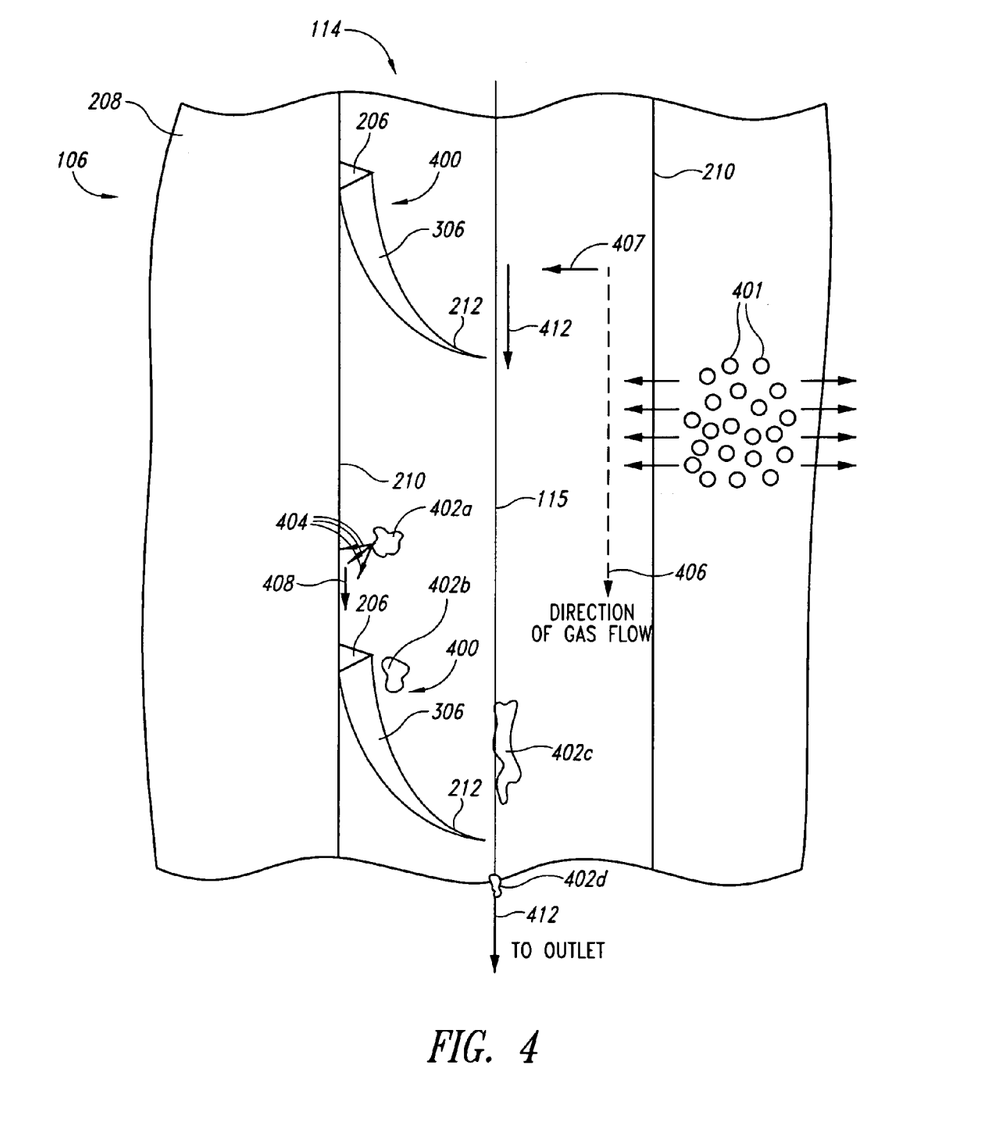
FIG. 4 is a plan view of a portion of a flow field plate according to another embodiment of the present invention, schematically illustrating accumulated water being transported by a water management fin.

FIG. 4 schematically illustrates accumulated water 402 being transported to the channel root 115 by another embodiment of a water management fin 400. In this embodiment, the water management fin 400 extends not only from the top surface 208 to the channel root 115, but also in a longitudinal direction along the channel 114, giving the fin a helical shape.

As a water droplet 401 emerges from the anode GDE 110 or the cathode GDE 112 into the flow channel 114, if the surface of the anode GDE 110 or cathode GDE 112 is hydrophilic, the water droplet 401 will disperse into a film, as conceptually illustrated by the shape of the "accumulated water" 402a. (If the surface were hydrophobic, the accumulated water 402a could have been conceptually illustrated as an elliptical-shaped water droplet.) Gas movement and/or pressure transports the accumulated water 402a to the edge 210 of the flow channel 114, as generally denoted by the arrows 404. The accumulated water 402a is transported to edge 210 where the accumulated water 402a is generally transported in the direction of gas flow traveling through channel 114, illustrated by the dashed-arrow 406. That is, the accumulated water 402a is moved generally in the direction of arrow 408.

The top surface 208 is typically in contact with the MEA under high load, and therefore water droplets 401 forming in the anode GDE 110 or cathode GDE 112 over this region will emerge at an edge 210 of the flow channel 114, and be generally transported in the direction of gas flow traveling through channel 114, illustrated by dashed-arrow 406.

As the accumulated water 402b comes into contact with the water management fin 400, the accumulated water 402b is guided along the face 306 of the water management fin 400 towards the channel root 115. Furthermore, the fins 400 may induce a transverse component of gas flow, as denoted by arrow 407, which further guides the accumulated water 402b towards the channel root 115. As the accumulated water 402c reaches the bottom portion 212 of the water management fin 400, the accumulated water 402c is directed onto the channel root 115, forming a rivulet. The rivulet of accumulated water 402c is transported along the channel root 115 by the gas movement and/or pressure, as denoted by arrow 412. The accumulated water 402d exits the channel 114 through an outlet (not shown), as generally denoted by arrow 412.

Figure 5:
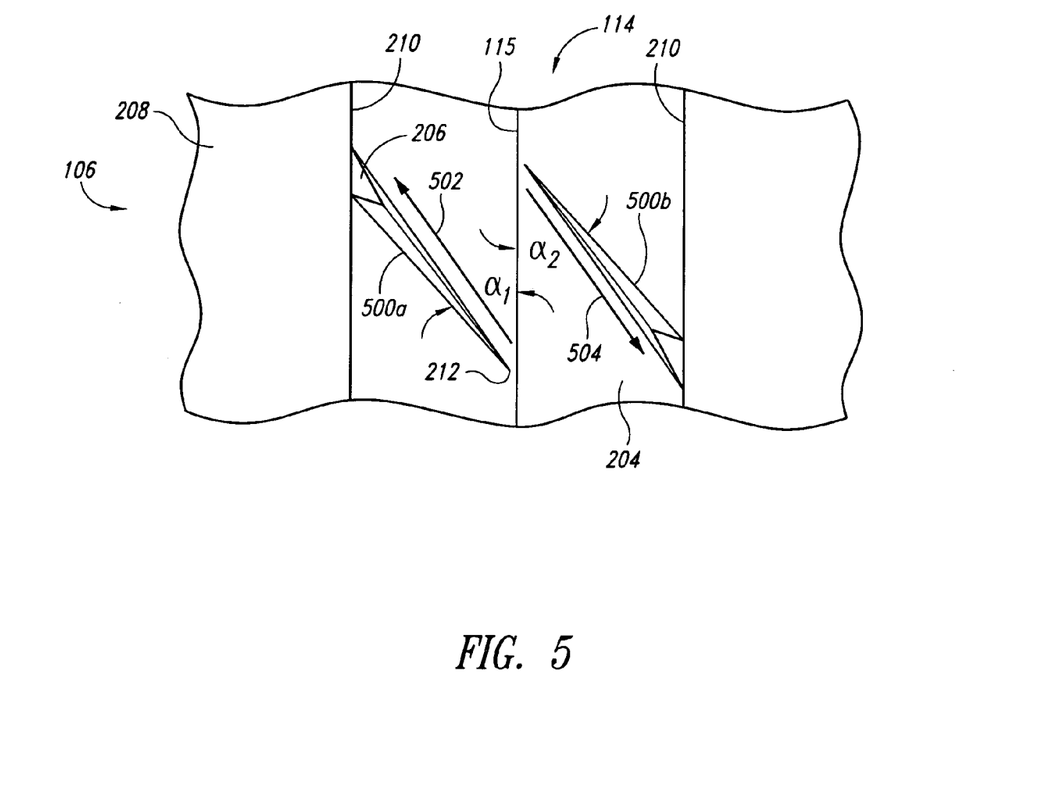
FIG. 5 is a plan view schematically illustrating two water management fins according to yet another embodiment of the present invention.

FIG. 5 illustrates a top view of two water management fins 500a and 500b angled at a helix angle ($\alpha$) with respect to the length of the channel root 115. With respect to the water management fin 500a, the helix angle $\alpha_1$ may be generally defined by a vector 502 drawn from the bottom portion 212 to the top portion 206. The helix angle $\alpha$ may be designed to have any suitable magnitude, from zero degrees (0°), wherein the water management fin 500a would be oriented parallel to the channel root 115, to nearly ninety degrees (±90°), wherein the water management fin would be oriented nearly perpendicular to the channel root 115 (see, e.g., FIG. 2).

In some embodiments, the helix angle $\alpha$ may be selected based upon anticipated or computed gas movement and/or pressure in the channel 114. In other embodiments, the helix angle $\alpha$ may be selected based upon manufacturing considerations or other parameters.

As noted above, any suitable helix angle $\alpha$ may be used. Furthermore, because gas movement and/or pressure may not be constant along the entire length of the channel 114, the helix angle $\alpha$ of individual water management fins along a particular channel may vary to change the effect of water management along the length of channel in some embodiments.

A second water management fin 500b is also illustrated in FIG. 5. With respect to water management fin 500b, the helix angle $\alpha_2$ may be similarly defined by a vector 504. In FIG. 5, the illustrated helix angle $\alpha_2$ has the same magnitude as the helix angle $\alpha_1$ for convenience. The helix angles $\alpha_1$ and $\alpha_2$ may be different, depending upon the embodiment.

Figure 6:
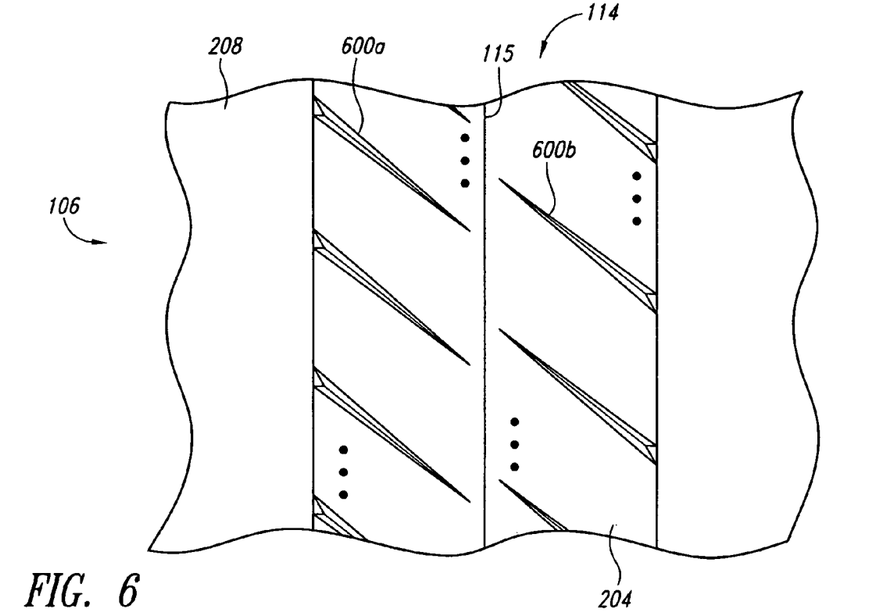
Figure 7:
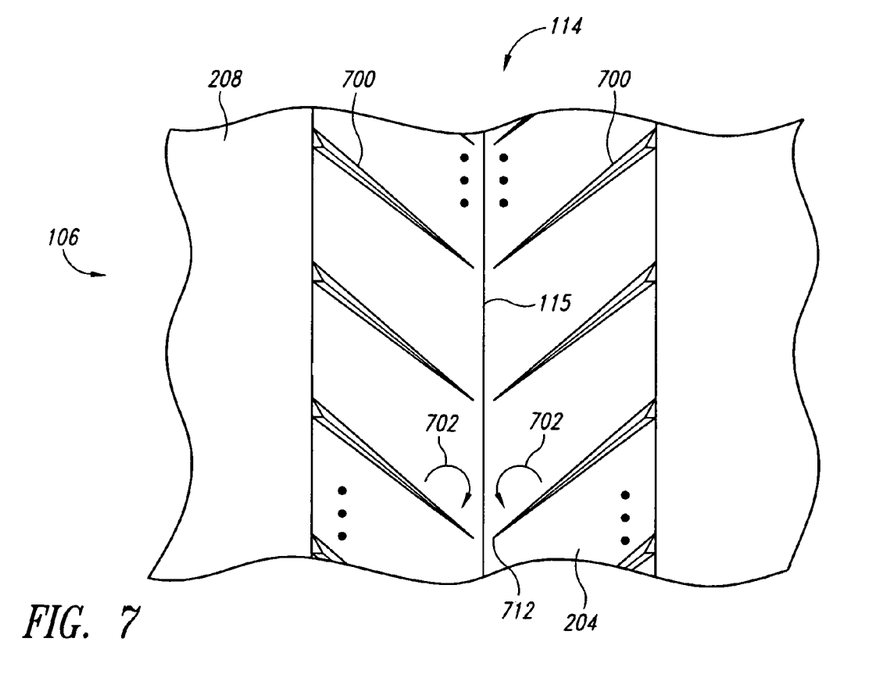

FIGS. 6 and 7 are plan views of additional embodiments of water management fin configurations angled with respect to the channel root 115. In FIG. 6, the alignment of the water management fins 600a on the left side of the channel 114 is parallel to the alignment of the water management fins 600b on the right side of the channel 114. The left side and the right side water management fins 600a, 600b are staggered along the length of the channel root 115. In some embodiments the left side water management fins 600a may be aligned with the corresponding bottom portions of the right side water management fins 600b.

In FIG. 7, the alignment of the water management fins 700 on the left side of the channel 114 are symmetrical bilaterally with the water management fins 700 on the right side of the channel 114. The bottom portions 712 of the water management fins 700 on the left and right sides are positioned approximately adjacent to each other (with respect to the channel root 115). That is, the bottom portions 712 of the plurality of the left side water management fins 700 are aligned with the corresponding bottom portions of the plurality of the right side water management fins 700. In some embodiments the left side and the right side water management fins may be staggered along the length of the channel root 115.

In this double-opposed helix embodiment of FIG. 7, two opposing vortices of gas (illustrated by arrows 702) are generated by each pair of opposing water management fins 700. The opposing gas vortices 702 may facilitate transport of accumulated water into and/or down the channel root 115.

It is appreciated from FIGS. 5-7 that the position, orientation and helix angle ($\alpha$) of the water management fins may be varied in any desired manner to facilitate water management objectives of interest. Such objectives may be based upon the particular nature of the fuel cell system and/or the particular nature of the flow field plate channel configurations.

Furthermore, in FIGS. 6 and 7 the water management fins are shown as being evenly spaced apart from each other along the length of the channel 114. In other embodiments, the spacing between water management fins may vary. For example, in regions of relatively greater amounts of water accumulation, water management fins more closely spaced together may be desirable. In regions of relatively lesser amounts of water accumulation, water management fins spaced farther apart may be desirable. All such various configurations of the orientation and placement of water management fins in a channel 114 are intended to be included within the scope of this disclosure.

Figure 8:
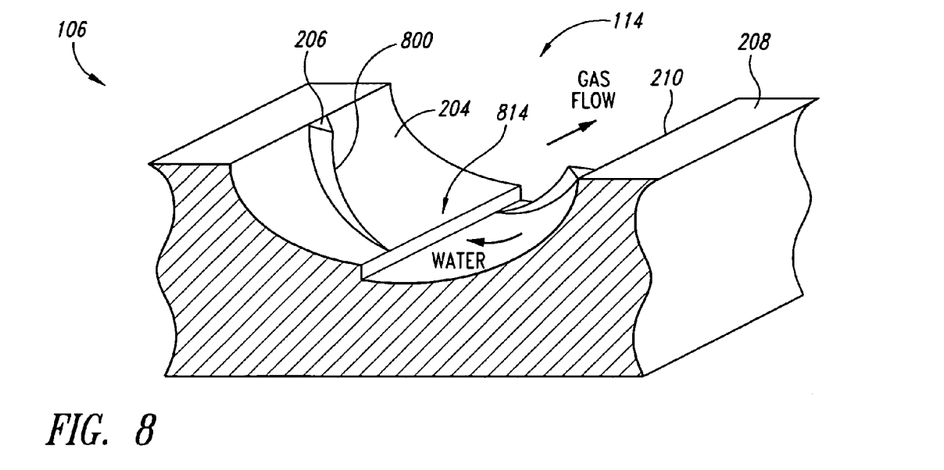

FIG. 8 is a perspective view of one embodiment of a channel root 814. The channel root 814 provides a guide directing the flow of the rivulet of accumulated water. The illustrated channel root 814 runs along the length of the channel 114, starting where accumulated water is directed by a water management fin 800, and ending at an outlet where the accumulated water exits the fuel cell. In FIG. 8, the channel root 814 is illustrated as an edge or as a discontinuity in the wall 204. As noted above, gas movement and/or pressure transports the accumulated water along the channel root 814. In one embodiment, the channel root 814 may result from an offset in opposing wall portions 204 of the channel 114. Such an offset or discontinuity may be formed by a die used to form the channel 114 or may be machined (i.e.; cut) or scored into the channel 114.

Figure 9A:
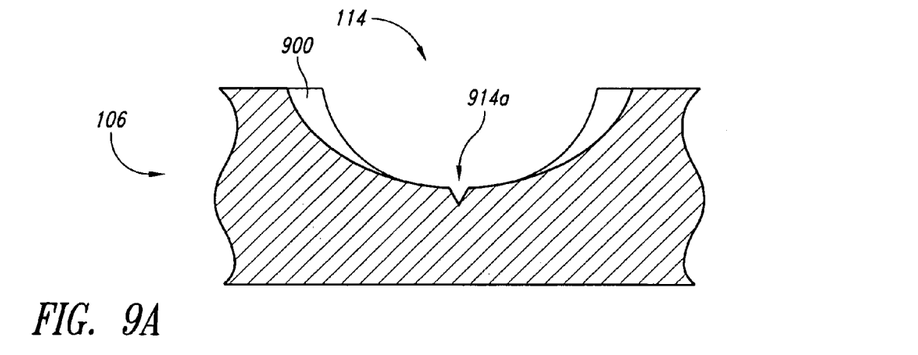
Figure 9B:
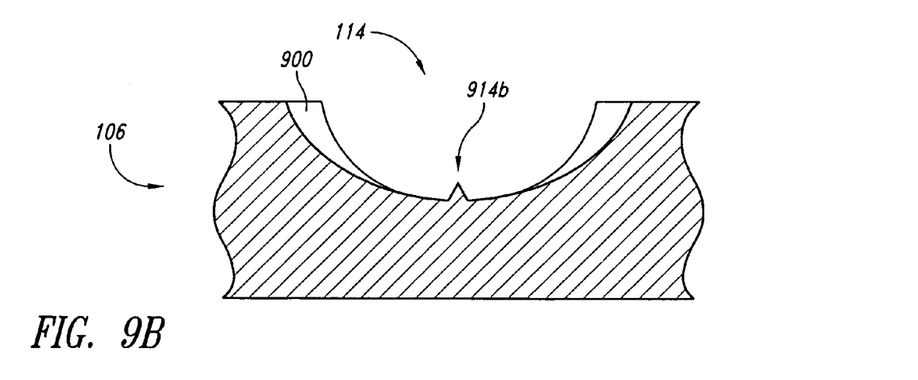
Figure 10A:
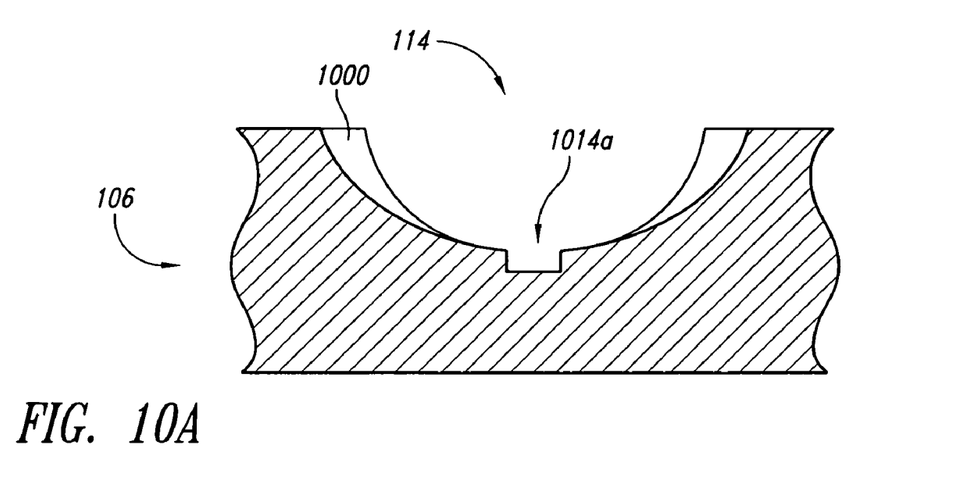
Figure 10B:
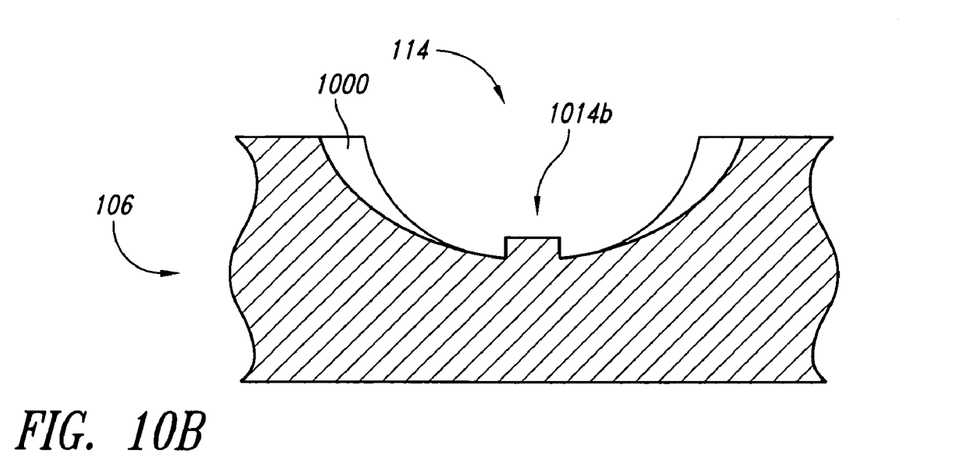

FIGS. 9A, 9B, 10A and 10B illustrate alternative embodiments of a channel root 914, 1014. In FIG. 9A, the channel root 914a is a V-shaped gutter and in FIG. 9B, the channel root 914b is a V-shaped curb. In FIG. 10A, the channel root 1014a is a rectalinear gutter and in FIG. 10B, the channel root 1014b is a rectangular curb. Any suitable channel or protruding ridge cross-section may be employed. The channel root 914, 1014 may be formed by a protrusion or extension on the die used to form the channel 114, or it may be machined or scored into the channel 114.

Figure 11A:
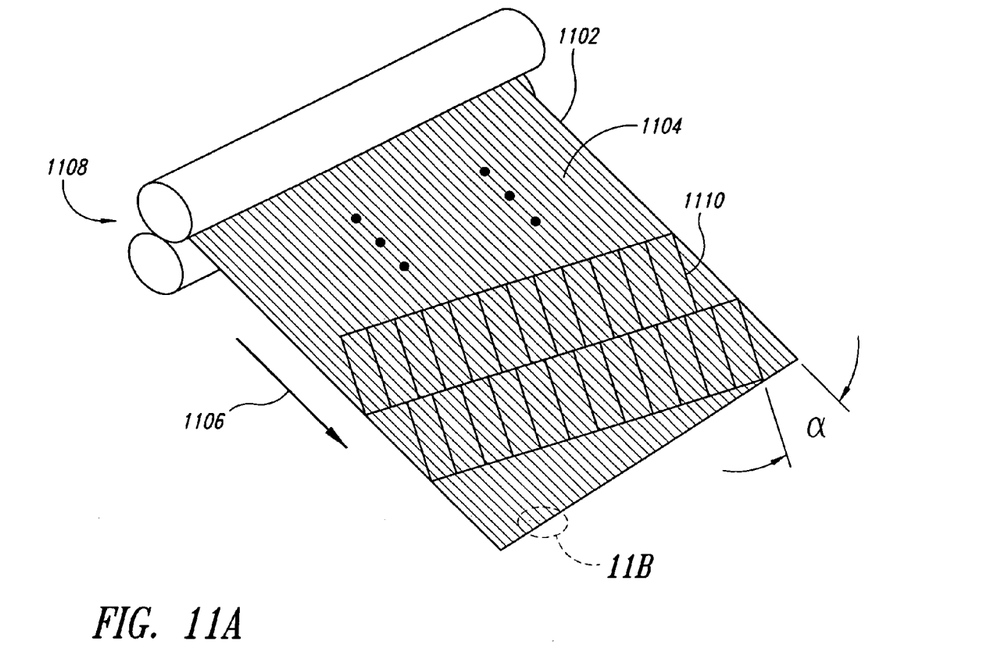
FIGS. 11A and 11B illustrate one embodiment of a method for forming water management microfins on a gas diffusion layer structure.
Figure 11B:
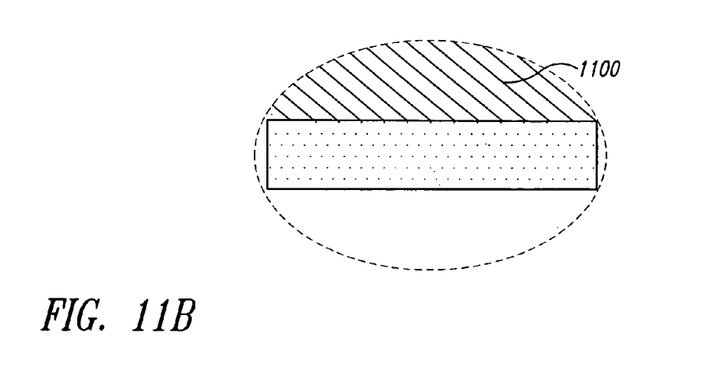

FIGS. 11A and 11B illustrate a method of forming water management microfins 1100 using existing fibers 1104 in a gas diffusion layer (GDL) material 1102. When a GDL is made of a woven, calendered, or other similarly formed material 1102, the orientation of the fibers 1104 of the material is typically biased in a common direction, as denoted by the arrow 1106, this in turn biases the shape and orientation of surface porosity. When a section 1110 is cut from the material to make the GDL, the fibers 1104 or fiber portions at the surface of the material 1102 can act as water management microfins 1100. The helix angle ($\alpha$) may be controlled by selecting the angle of the section 1110 with respect to the direction of fiber orientation 1106.

Figures 12A, 12B, 12C:
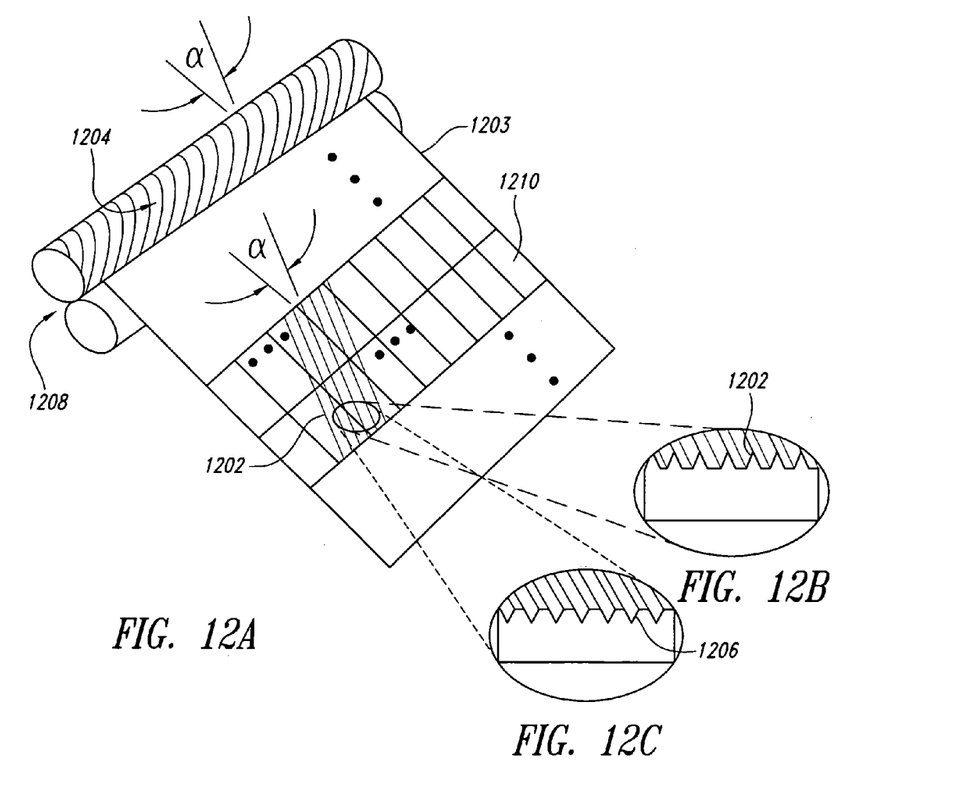
FIGS. 12A, 12B and 12C illustrate another embodiment of a method for forming water management microfins on a gas diffusion layer structure.

FIGS. 12A, 12B and 12C illustrate a method of forming water management microfins 1202 using score lines 1204 on the surface of one or more rollers 1208 that calender a gas diffusion layer (GDL) material 1203. Score lines 1204 may be any trench-like marks cut or scored into one or more rollers 1208. The helix angle ($\alpha$) may be controlled by selecting the orientation of the score lines 1204 with respect to the direction of calendering. As the material 1203 is calendered by the helically scored rollers 1208; the material 1203 is urged into the score lines 1204, thereby forming the relatively small fins 1202, referred to herein as microfins.

In an alternative embodiment, the score lines 1204 may be protrusions on the surface of the rollers 1208 (such as, but not limited to, knife edges or the like), which cut or impress trenches, grooves or the like into the material 1203 as the rollers 1208 calender the material 1203, thereby forming inverse water management microfins 1206. GDLs cut from the material 1203 having such inverse microfins 1206 facilitate water management by directing the flow of water along the surface of the GDL.

Some embodiments may employ both microfins 1202 and inverse microfins 1206. In alternative embodiments, the score lines 1204 may be oriented in the same direction as fibers 1104 or fiber portions at the surface of the material 1102 (FIG. 11). Thus, the microfins 1202 formed by score lines 1204 are oriented in the direction of fiber orientation. These embodiments, accordingly, may be viewed as a combination of one or more of the above-described embodiments.

Furthermore, with respect to the above-described MEAs having microfins 1100, 1202 and/or inverse microfins 1206, the microfins also improve the effect of the gas movement and/or pressure that transports the accumulated water along the channel root 115. A cyclone effect induced by the water management microfins 1202 on the surface of the MEA increases force applied to the accumulated water, thereby facilitating the process of removing accumulated water.

Figure 13:
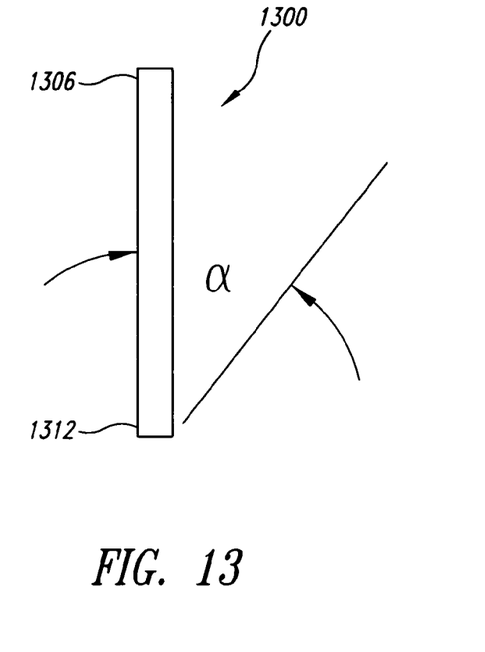
FIGS. 13 and 14 schematically illustrate additional alternative embodiments of water management fins.
Figure 14:
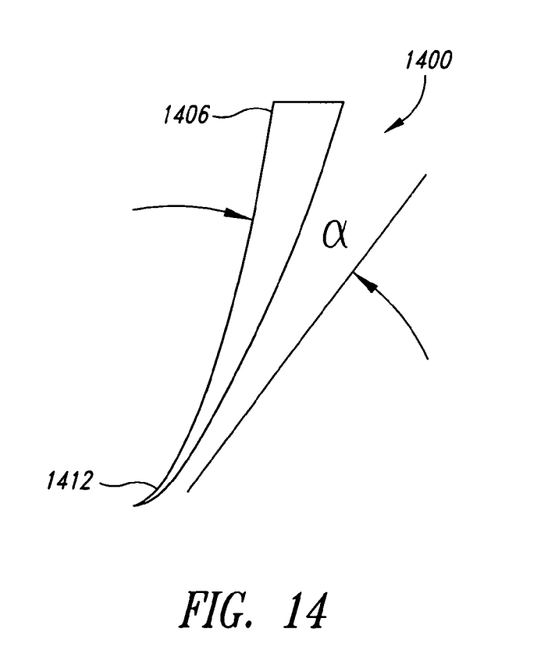

FIGS. 13 and 14 illustrate alternative embodiments of water management fins 1300, 1400. The above-described water management fin 100 in FIG. 3 was described as tapering in thickness from the top portion 206 to the bottom portion 212. FIG. 13 illustrates a water management fin 1300 that is not tapered in thickness. That is, the thickness at the top portion 1306 is the same, or approximately the same, as the bottom portion 1312. Other embodiments may vary the thickness in any manner.

The water management fin 100 in FIG. 3 was described as having a straight alignment from the top portion 206 to the bottom portion 212. FIG. 14 illustrates a water management fin 1400 that is curved from the top portion 1406 to the bottom portion 1412. That is, the helix angle ($\alpha$) varies along the length of the water management fin 1400. In other embodiments, the curvature of the water management fin 100 can vary in any suitable manner.

In some alternative embodiments, the thickness and the curvature of mater management fins may both vary. This embodiment, accordingly, may be viewed as a combination of the embodiments of FIGS. 13 and 14.

The water management fin 100 was described as having a triangular cross-section in FIG. 3. In other embodiments, different cross-sectional shapes may be used. For example, the cross-sectional shape of a water management fin 100 may be rectangular, trapezoidal, elliptical, half-round, quarter-round, tapered or may have any other suitable shape.

The water management fins 100 were described as residing in channels 114 having an elliptical cross-section. In other embodiments, different cross-sections of the channels 114 may be used. For example, the cross-sectional shape of the channels 114 may be, among other shapes, circular, square, rectangular, or trapezoidal. Any of these channels 114 may have one-or more water management fins 100 residing on its wall 204.

The water management fins 100 were described as protruding outward from the walls 204 of the channel 114. In such an embodiment, the dies or other devices used to form the channels 114 may be scored or have grooves thereon which correspond to negative images of the desired water management fins 100. When the dies are used to form the channels 114, portions of the material of the plate fill the void of the scores or grooves, thereby forming a protruding water management fin 100.

It is appreciated that the size of water management fins 100 may vary along the length of a channel 114. For example, smaller water management fins 100 may be used where there is relatively smaller amounts of water accumulation. In fuel cell regions subject to relatively large amounts of water accumulation, larger water management fins 100 may be used. The height, thickness and/or length of the water management fins 100 may be varied.

In other embodiments, the water management fins 100 may be inverted. That is, the water management fins may be grooves, channels or the like residing in a channel 114. In such an embodiment, the dies or other devices used to form the channels 114 may have outwardly extending fins, ridges or the like which correspond to negative images of the desired water management fins 100. When such dies are used to form the channels 114, portions of the material are compressed, thereby forming inverted water management fins 100. Inverted water management fins 100 could instead be machined or scored into the walls 204 after fabrication.

In the various above-described embodiments, the water management fins 100 were described and illustrated as residing in the channels 114 of the fuel cell flow field plates. Depending upon the type of fuel cell system, the water management fins 100 may reside in the channels 114 of fuel cell flow field plates associated with both the anode side and the cathode side of the fuel cell system. In other embodiments, water management fins 100 reside only in the-channels 114 of fuel cell flow field plates on the anode side of the fuel cell system. Accordingly, such embodiments may be suitable for fuel cells operating in a dead-ended mode of operation.

Unless the context requires otherwise, throughout the specification and claims which follow, the word "comprise" and variations thereof, such as, "comprises"and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system for transporting accumulated water in a fuel cell system comprising:
   a fuel cell flow field plate;
   at least one channel having a generally "U" shaped cross-section disposed on a surface of the fuel cell flow field plate, the channel having a top portion approximate the surface of the fuel cell flow field plate and a channel root away from the surface of the fuel cell flow field plate; and
   at least one water management fin residing on a wall of the channel and arranged within the channel and contacting the flow field plate surface, such that when the accumulated water is transported along the channel, the water management fin guides at least some of the accumulated water towards a channel root,
   wherein the water management fin comprises:
   a top portion approximately at least substantially flush with the flow field plate surface;
   a bottom portion extending towards a channel root of the channel; and
   a face portion disposed between the top and bottom portions and protruding outward from the wall of the channel,
   wherein the accumulated water transported along the channel is guided by the fin face from proximate the top portion of the fin towards the bottom portion of the fin to the channel root.

2. The system of claim 1 wherein a channel root is between a first side of the wall and a second side of the wall, and further comprising;
   a plurality of first water management fins residing on the first side of the wall; and
   a plurality of second water management fins residing on the second side of the wall.

3. The system of claim 2 wherein the bottom portions of the plurality of first water management fins are at least substantially aligned with the corresponding bottom portions of the plurality of second water management fins.

4. The system of claim 2 wherein the bottom portions of the plurality of first water management fins are oriented in a direction approximately perpendicular with the corresponding bottom portions of the plurality of second water management fins.

5. The system of claim 4 wherein, during operation, the alignment of the bottom portions of the plurality of first water management fins and the corresponding bottom portions of the plurality of second water management fins generate two opposing vortices of gas that facilitate transport of the accumulated water into the channel root.

6. The system of claim 2 wherein the bottom portions of the plurality of first water management fins are aligned approximately parallel with the corresponding bottom portions of the plurality of second water management fins.

7. The system of claim 2 wherein the bottom portions of the plurality of first water management fins and the bottom portions of the plurality of second water management fins are staggered with respect to each other along the channel.

8. The system of claim 1, further comprising:
   a channel root on a central portion of the channel, wherein the water management fin is adapted to guide the accumulated water to the channel root, and wherein the channel root is adapted to guide the accumulated water to an outlet.

9. The system of claim 8 wherein the channel root comprises a discontinuity between a first side of the wall and a second side of the wall.

10. The system of claim 8 wherein the channel root comprises a groove between a first side of the wall and a second side of the wall.

11. The system of claim 8 wherein the channel root comprises a ridge between a first side of the wall and a second side of the wall.

12. The system of claim 8 wherein the channel root comprises an edge between a first side of the wall and a second side of the wall.

13. The system of claim 8 wherein the water management fin tapers from a top portion of the water management fin to a bottom potion of the water management fin.

14. The system of claim 8 wherein the water management fin has a triangular cross-section.

15. The system of claim 8 wherein the water management fin is an inverted water management fin protruding into the wall of the channel.

16. The system of claim 8 wherein the water management fin is angled with respect to the channel root of the channel at a helix angle ($\alpha$).

17. The system of claim 16 wherein a magnitude of the helix angle ($\alpha$) is greater than zero degrees.

18. The system of claim 16 wherein a magnitude of the helix angle ($\alpha$) is approximately zero degrees such that the water management fin is approximately parallel with the channel root.

19. The system of claim 16 wherein a magnitude of the helix angle ($\alpha$) is approximately ninety degrees such that the water management fin is approximately perpendicular with the channel root.

20. The system of claim 1 wherein the channel is configured to transport a reactant to an anode of the fuel cell system.

21. The system of claim 1 wherein the channel is configured to transport an oxidant to a cathode of the fuel cell system.

22. The system of claim 1, further comprising a plurality of water management microfins formed on a gas diffusion layer (GDL) material, the GDL material adjacent to the surface of the flow field plate.

23. The system of claim 22 wherein the water management fins and the water management microfins are aligned with the channel root of the channel at a helix angle ($\alpha$).

24. The system of claim 22 wherein the water management microfins are formed by a plurality of fibers of the GDL material.

25. The system of claim 22 wherein the water management microfins are formed by a plurality of score lines on the surface of the GDL material.

26. The system of claim 1, wherein a gas diffusion layer (GDL) material is adjacent to the surface of the flow field plate, and wherein the water management fin is angled to transport water away from the GDL.

27. The system of claim 1, wherein the fin has a base at the channel wall and extends outwards to form a peak, and wherein peak decreases going from channel top towards channel root.

28. A system for transporting accumulated water in a fuel cell system comprising:
- a fuel cell flow field plate;
- at least one channel having a generally "U" shaped cross-section disposed on a surface of the fuel cell flow field plate, wherein the channel has a top portion and a channel root; and
- at least one water management fin residing on a wall of the channel and arranged within the channel, wherein the water management fin has a top portion (206) in proximity to the surface of the fuel cell flow field plate and an opposing bottom portion of the fin (212) in proximity to the channel root, and wherein a water management fin (100) is arranged to guide at least some of the water from the top portion of the fin (206) to the bottom portion of the fin (212) and onto the channel root (115),
- wherein the water management fin comprises:
- a top portion approximately at least substantially flush with the flow field plate surface;
- a bottom portion extending towards a channel root of the channel; and
- a face portion disposed between the top and bottom portions and protruding outward from the wall of the channel,
- wherein the accumulated water transported along the channel is guided by the fin face from proximate the top portion of the fin towards the bottom portion of the fin to the channel root.

29. A system for transporting accumulated water in a fuel cell system comprising:
- a fuel cell flow field plate;
- at least one channel having a generally "U" shaped cross-section disposed on a surface of the fuel cell flow field plate, wherein the channel has a top portion approximate the surface of the fuel cell flow field plate and a channel root; and
- at least one water management fin residing on a wall of the channel and extending into the channel, wherein the water management fin has a top portion (206) in proximity to the surface of the fuel cell flow field plate and an opposing bottom portion of the fin (212) in proximity to the channel root, and wherein a water management fin (100) is angled with respect to the channel root of the channel at a helix angle (α),
- wherein the water management fin comprises:
- a top portion approximately at least substantially flush with the flow field plate surface;
- a bottom portion extending towards a channel root of the channel; and
- a face portion disposed between the top and bottom portions and protruding outward from the wall of the channel,
- wherein the accumulated water transported along the channel is guided by the fin face from proximate the top portion of the fin towards the bottom portion of the fin to the channel root.

30. A system for transporting accumulated water in a fuel cell system comprising:
- a fuel cell flow field plate;
- a gas diffusion layer (GDL) material adjacent to the surface of the flow field plate;
- at least one channel having a generally "U" shaped cross-section disposed on a surface of the fuel cell flow field plate, wherein the channel has a top portion approximate the surface of the fuel cell flow field plate adjacent the GDL and a channel root away from the GDL; and
- at least one water management fin residing on a wall of the channel and arranged within the channel, wherein the water management fin has a top portion (206) contracting the surface of the fuel cell flow field plate and an opposing bottom portion of the fin (212) in proximity to the channel root, and wherein the water management fin is angled to transport water away from the GDL,
- wherein the water management fin comprises:
- a top portion approximately at least substantially flush with the flow field plate surface;
- a bottom portion extending towards a channel root of the channel; and
- a face portion disposed between the top and bottom portions and protruding outward from the wall of the channel,
- wherein the accumulated water transported along the channel is guided by the fin face from proximate the top portion of the fin towards the bottom portion of the fin to the channel root.

* * * * *